United States Patent
Hwang et al.

(10) Patent No.: US 7,136,413 B2
(45) Date of Patent: Nov. 14, 2006

(54) METHOD AND APPARATUS FOR GENERATION OF RELIABILITY INFORMATION WITH DIVERSITY

(75) Inventors: Ho-Chi Hwang, Hsin-Chu (TW); Ching-Yao Su, Tainan (TW); Wei-Nan Sun, Kaohsiung (TW)

(73) Assignee: Mediatek, Inc., Hsin-Chu (TW)

( * ) Notice: Subject to any disclaimer, the term of this patent is extended or adjusted under 35 U.S.C. 154(b) by 663 days.

(21) Appl. No.: 10/226,985

(22) Filed: Aug. 23, 2002

(65) Prior Publication Data
US 2004/0037381 A1  Feb. 26, 2004

(51) Int. Cl.
*G06F 11/00* (2006.01)
*G06F 17/10* (2006.01)
*H04L 5/12* (2006.01)

(52) U.S. Cl. ............... 375/229; 375/262; 375/265; 708/322; 708/323; 714/1; 714/48

(58) Field of Classification Search .......... None
See application file for complete search history.

(56) References Cited

U.S. PATENT DOCUMENTS

| | | | | |
|---|---|---|---|---|
| 5,119,400 A | * | 6/1992 | Koch | 375/230 |
| 5,307,374 A | * | 4/1994 | Baier | 375/229 |
| 5,530,725 A | * | 6/1996 | Koch | 375/347 |
| 5,844,946 A | * | 12/1998 | Nagayasu | 375/341 |
| 6,012,161 A | * | 1/2000 | Ariyavisitakul et al. | 714/795 |
| 6,269,116 B1 | * | 7/2001 | Javerbring et al. | 375/229 |
| 6,633,615 B1 | * | 10/2003 | Pekarich et al. | 375/265 |
| 6,782,060 B1 | * | 8/2004 | Hartmann et al. | 375/341 |
| 6,963,546 B1 | * | 11/2005 | Misra et al. | 370/294 |

* cited by examiner

*Primary Examiner*—Kevin Kim
*Assistant Examiner*—Linda Wong
(74) *Attorney, Agent, or Firm*—Hogan & Hartson LLP

(57) ABSTRACT

A receiver includes a Viterbi-like equalizer that provides diversity combining of soft values to produce reliability information. The output reliability information at time k is the average of the first reliability information at time k and the second reliability information at time (k−1) after being normalized by the noise power. The first reliability information at time k is the difference between the two accumulated metrics of the two preceding nodes arriving at the same node having the global minimum node metric at time k over all transitions of all states. The second reliability function at time k is the difference between the best accumulated metric characterized by the last (L−1) bit being binary "one" and the best accumulated metric characterized by the last (L−1) bit being binary "zero."

12 Claims, 6 Drawing Sheets

METHOD AND APPARATUS FOR GENERATION OF RELIABILITY INFORMATION WITH DIVERSITY

BACKGROUND OF THE INVENTION

1. Field of the Invention

The present invention relates to communications systems of the type that characterize received signals according to historical state transitions and particularly to the generation of reliability information used by such systems in characterizing received signals.

2. Discussion of the Related Art

In digital communication systems, the frequency-selective channels often introduce intersymbol interference (ISI) on the transmitted symbols. To mitigate the resulting distortion effects and channel impairment, digital communication systems often implement digital demodulators designed to compensate for the effects of intersymbol interference. One of the popular demodulators for digital communication systems includes a Viterbi algorithm (VA) equalizer that provides outputs to a de-interleaver and a convolutional decoder. The Viterbi algorithm is suitable for equalization and decoder applications and is described in "Viterbi Algorithm," by G. David Forney Jr., Proceedings of IEEE, Vol. 61, No. 3, pp. 268–278 (1973). Some applications of the Viterbi algorithm with soft outputs are described in "A Viterbi Algorithm with Soft-Decision Outputs and its Applications," by J. Hagenauer and P. Hoeher, Proceedings of the GLOBECOM'89, No. 47.1, pp. 1680–1686 (1989). In the paper by Hagenauer, et al., the advantages of providing soft outputs of reliability information to the decoder for use in decoding symbols are outlined. This method uses a large memory space for storing accumulated candidate node metrics and extra trace-back procedures.

The Viterbi algorithm equalizer is an efficient receiver that uses maximum likelihood sequence estimation (MLSE). Viterbi algorithm equalizers achieve 1–4 dB gain if the equalizer can deliver soft decisions to the de-interleaver and convolutional decoder rather than hard decisions. Therefore, soft-output Viterbi algorithm (SOVA) equalizers and one-step soft output Viterbi algorithm equalizers presently prevail in receiver designs. Most soft output Viterbi algorithm equalizers store the soft values of all states during processing and while performing the trace back procedure over all possible prior states to decode the received symbol sequence. U.S. Pat. No. 5,119,400 proposes a Viterbi-like equalizer that does not store the soft values of all states during processing and does not utilize a trace back procedure. Better reliability information can be obtained using the system described in the patent.

U.S. Pat. No. 5,119,400 discusses a reliability information strategy that identifies all possible paths whose $2^L$ last state transitions correspond to a binary value "1" and all possible paths whose L last state transitions correspond to a binary "0." The path having the larger probability function is selected, the binary value assigned to the larger of the two selected values is taken as the estimate $a_{k-L}$ and the reliability information is obtained from the two selected probability functions. By using this method, neither a large memory space nor trace back procedures are used by the Viterbi-like equalizer and a significant amount of memory and processing time can be saved.

SUMMARY OF THE PREFERRED EMBODIMENTS

An aspect of the present invention provides a receiver for a communications system including a receiver front end receiving signals from a wireless channel and providing sampled data signals. An equalizer responsive to the sampled data signals provides estimates of transmitted data and outputs reliability information representative of a reliability of the estimates of the transmitted data. A decoder responsive to the estimates of the transmitted data and the reliability information from the equalizer generates recovered symbols. The equalizer determines first reliability information for a first sample time, determines second reliability information for a second sample time earlier than the first sample time, and determines the output reliability information by combining the first and second reliability information.

Another aspect of the present invention provides a receiver for a communications system including a receiver front end receiving signals from a wireless channel and providing sampled data signals. An equalizer responsive to the sampled data signals provides estimates of transmitted data and outputs reliability information representative of a reliability of the estimates of the transmitted data. A decoder recovers the transmitted data according to the reliability information from the equalizer. The equalizer generates reliability information $\hat{L}_{k-L}$ by combining of a first reliability function $\hat{L}_{1,k-L}$ at time k and a second reliability function $\hat{L}_{2,k-L-1}$ at time k–1.

BRIEF DESCRIPTION OF THE DRAWINGS

The invention will be described with reference to the exemplary embodiments shown in the drawings, which illustrate and form part of the disclosure.

DETAILED DESCRIPTION OF THE PREFERRED EMBODIMENTS

Figure 1:
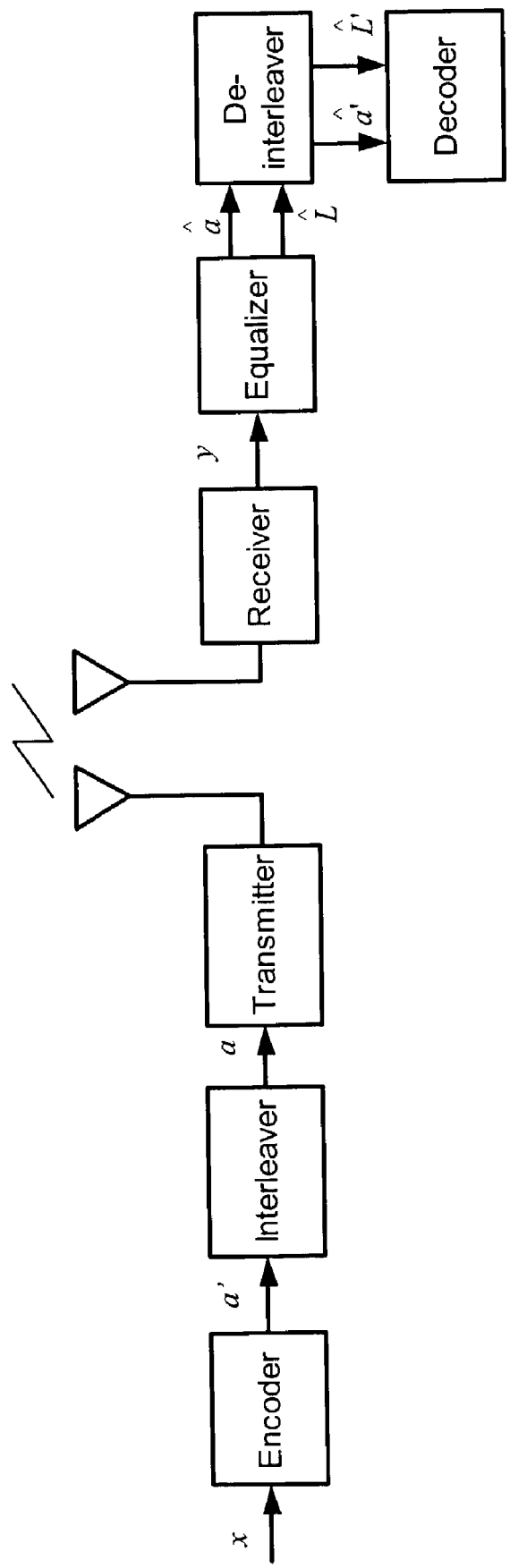
FIG. 1 shows a block diagram of a digital communications system.

The Viterbi-like algorithm can be sensitive to channel estimation accuracy. For example, performance can be degraded if the channel estimation is not sufficiently accurate, which is often the case in the far adjacent channel responses (i.e., paths with large delays). The conventional soft-output Viterbi algorithm stores soft outputs of all states during processing and performs back tracing from the end of the receiving sequence, which can require a large memory. Certain preferred embodiments of the present invention provide reduced sensitivity to channel estimation errors.

Other preferred embodiments provide a solution that does not require a large memory, although it could be implemented with a large memory and still provide other advantages.

Preferred embodiments of the present invention provide a Viterbi-like equalizer that uses a diversity combining of soft values to produce reliability information. Experimental simulations on a receiver in accordance with the architecture described here show that the receiver achieves better performance than a conventional Viterbi-like equalizer in some fading channels. The present Viterbi-like equalizer produces both the first reliability information and the second reliability information at time k. The output reliability information at time k is the average of the first reliability information at time k and the second reliability information at time k−1 after the terms are normalized by the estimated noise power. Finally the output reliability information is delivered to the de-interleaver and convolutional decoder for further processing.

The second reliability information determined at time k−1 is delayed and then combined with the first reliability information at time k to produce the output reliability information at time k. The output reliability information at time k corresponds to the reliability information for the L last bit, where L represents the channel memory (i.e., the fading channel spans L symbols). The first reliability information at time k is the difference between the two accumulated metrics of the two preceding nodes arriving at the same node having the global minimum node metric at time k over all transitions of all states. On the other hand, the second reliability function at time k is the difference between the best accumulated metric characterized by the L−1 last bit being binary "one" and the best accumulated metric characterized by the L−1 last bit being binary "zero." The best paths come from one of the two groups characterized by the tentative decision of the value of the L last bit at time k.

Preferred embodiments of the invention relate to a digital communication system using an equalizer, de-interleaver and decoder to cope with the inter symbol interference (ISI) problem introduced by the non-ideal bandwidth-limited signal channel. Due to the ISI in the signal channel, the received signal samples depend not only on the current information symbol but also on the previous L symbols. That is, for binary transmission, each received signal sample corresponds to $2^L$ states and a probability function can be assigned to the probability of the transition from one state to another. In this manner, the most probable transition among all $2^{L+1}$ probability functions at each time step can be calculated and then used. This selected probability divided by the probability of the counterpart transition merging at the same state (which is equivalent to the difference in the node metric between the selected one and the counterpart) provides the first reliability information. Meanwhile, the second reliability information is produced for each time step to be combined with the first reliability information through averaging to de-sensitize the decoder to channel estimation errors. Instead of using the probability ratio, the receiver uses the ratio of exponential functions, which corresponds to a difference of two node metrics, and that is the actual reliability information that the receiver provides as soft outputs to the de-interleaver and decoder. The sign of the soft output corresponds to a binary one or zero and the magnitude corresponds to the reliability. For example, 0 means the most un-reliable estimates, and the maximum positive or negative values identify the most reliable estimates.

This discussion references state diagrams, transition paths and metrics that characterize those paths. These are familiar terms to those that work with Viterbi equalizers and Viterbi-like equalizers. Illustrations and explanations of certain of these terms can be found, among other places, in U.S. Pat. No. 5,119,400, which is hereby incorporated by reference in its entirety and specifically with respect to those illustrations and explanations.

The VA-like equalizer delivers reliability information for the L last bit, $a_{k-L}$, at time k. For simplicity, preferred embodiments use the metric difference instead of the probability exponential ratio and use a diversity combination to generate the output reliability information to de-sensitize the system to errors in the channel estimation. The output reliability information is the average of the first reliability information at time k and the second reliability information at time k−1 after being normalized by the noise power or an estimate of the noise power. The first reliability information at time k is the difference between the two accumulated node metrics leading to the same state (node) having the global minimum accumulated metric among all states. To derive the second reliability information at time k, preferred embodiments split all state transitions into two groups, which are characterized by tentative hard-decisions of $a_{k-L}$ being "one" and "zero", respectively. Preferably the equalizer uses the knowledge of the tentative hard-decision of $a_{k-L}$, and uses the two minimum node metrics characterized by the L−1 last bit being "one" and "zero" in the corresponding group to derive the second reliability information at time k.

FIG. 1 provides an overview of a digital communications system in which preferred aspects of the present invention may be implemented. Data to be transmitted are processed and output over a transmitter. A receiver detects the transmitted signal from the wireless channel and processes the signal to recover the data. On the transmission side, the input data sequence is provided to a convolutional encoder, which generates a binary output sequence ($a'_0$, $a'_1$, . . . , $a'_k$, . . . ) from the input binary data sequence ($x_0$, $x_1$, . . . , $x_k$, . . . ) according to a specific polynomial encoding for the communication system. The encoder provides its output to an interleaver that reorders the sequence ($a'_0$, $a'_1$, . . . , $a'_k$, . . . ) according to a specific interleaving scheme that spreads the input sequence into several blocks to be transmitted at different times. This interleaving provides greater statistical independence to the data and provides a greater ability to recover from an error or localized noise event. The output of the interleaver is a sequence ($a_0$, $a_1$, . . . , $a_k$, . . . ) which is fed to the transmitter. The transmitter generates an information signal that propagates through a frequency-selective (wireless) fading channel.

The receiver receives an analog signal y(t) that includes the original transmitted signal, inter-symbol interference from previous transmitted signals due to dispersion in the channel, and noise. Within the illustrated receiver function is typically an A/D (analog to digital) converter that converts the analog received signal y(t) into digital signal samples ($y_0$, $y_1$, . . . , $y_k$, . . . ). The receiver outputs these samples to an equalizer for recovering the transmitted binary sequence ($a_0$, $a_1$, . . . , $a_k$, . . . ) from the sequence of (distorted) signal samples ($y_0$, $y_1$, . . . , $y_k$, . . . ) and for generating reliability information for further processing.

After processing in the equalizer, the output data estimates and the reliability measures are provided to the de-interleaver for re-ordering the input estimates ($â_0$, $â_1$, . . . , $â_k$, . . . ), ($L̂_0$, $L̂_1$, . . . , $L̂_k$, . . . ). The de-interleaver follows the reverse procedure to generate re-ordered estimates ($\hat{a}^\uparrow_0, \hat{a}^\uparrow_1, \ldots, \hat{a}^\uparrow_k, \ldots$), ($\hat{L}_0, \hat{L}_1, \ldots, \hat{L}_k, \ldots$). The re-ordered data are provided to a decoder that recovers the transmitted sequence ($x_0, x_1, \ldots, x_k, \ldots$) using the same polynomials as the encoder and ($\hat{a}_0, \hat{a}_1, \ldots, \hat{a}_k, \ldots$), ($\hat{L}_0, \hat{L}_1, \ldots, \hat{L}_k, \ldots$), which are th re-ordered data and the reliability information, respectively.

Preferred embodiments of the present invention provide an improved method for generating reliability information. This is accomplished in the equalizer through a diversity combination of a first reliability function at a first sample time and a second reliability function at a second sample time prior to the first. In other words, the equalizer generates the reliability information $\hat{L}_{k-L}$ by a diversity combination of the first reliability function $\hat{L}_{1,k-L}$ at time k and the second reliability information $\hat{L}_{2,k-(L+1)}$ at time k−1.

Figure 2:
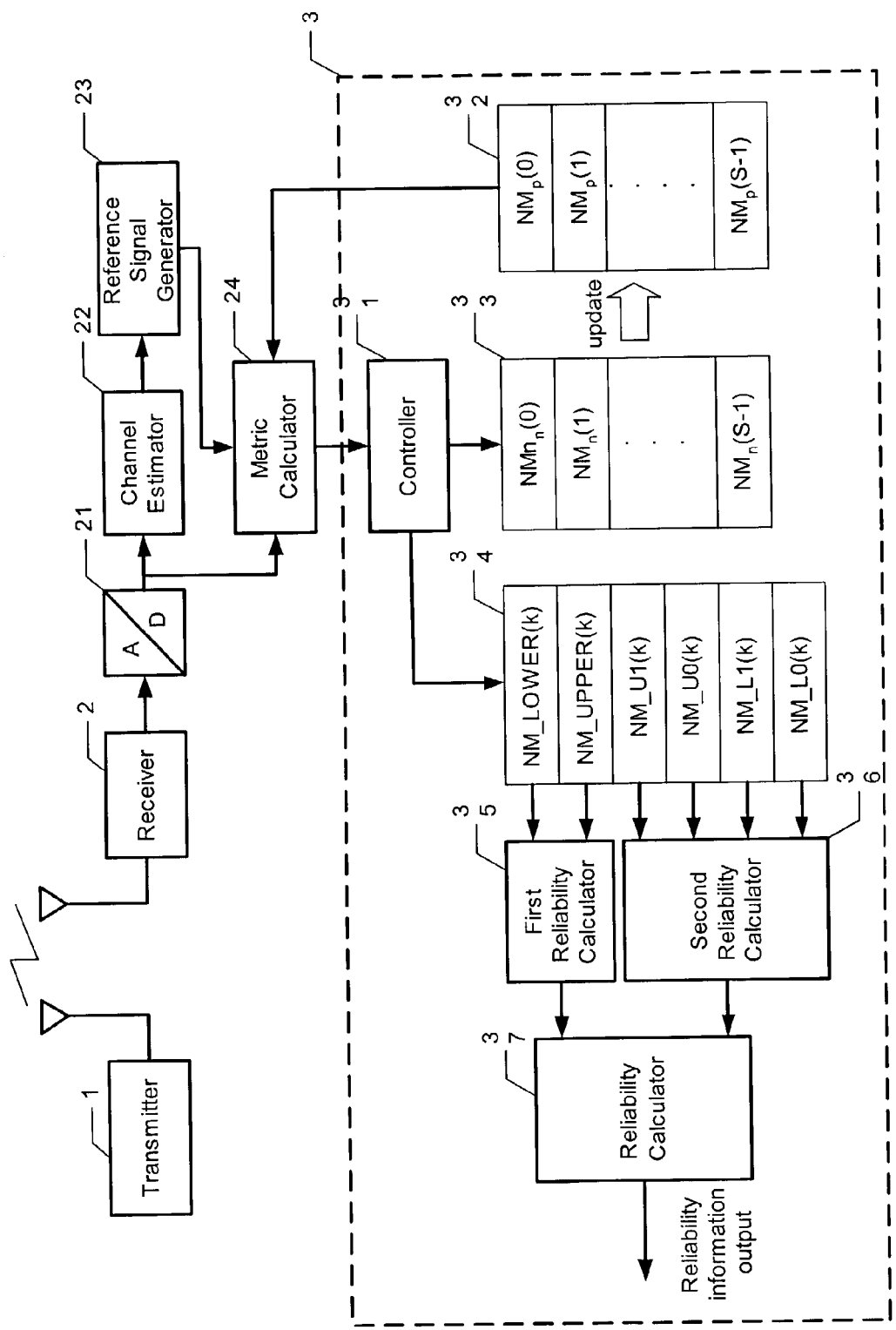
FIG. 2 shows a block diagram of a wireless communication system for generating reliability information with diversity.

FIG. 2 shows a block diagram of a wireless communication system in which the transmitter 1 transmits information a through a bandwidth-limited radio channel. r(t) is received at the receiving site 2 and converted to digital samples for subsequent digital processing. Because of the multi-path effect and other noise sources in the radio channel, the transmitted signal s(t) is distorted by a fading channel, noise, interference, etc. The multi-path or fading channel can be modeled as a tapped delay line filter. Therefore, the received sample $y_k$ can be modeled as superposed components from the current and previously transmitted bits $a_k, a_{k-1}, a_{k-2}, \ldots a_{k-L}$ with different weightings relating to the channel responses and contributions from noise and interference. The parameter L relates to the channel memory depth (channel span) and represents how many sample periods it takes for the superposition effect from the $a_k$ bit to become insignificant. This parameter depends on different channel characteristics. For example, the modeled delay spread of the channel in a flat, rural area is small but in an area having hilly terrain the delay spread can be large, which corresponds to small and large L values, respectively. Although the dispersive channel can exist on both radio and cable transmission systems, the distortion is more severe in radio transmission systems than in cable systems due to mobility of the channel in radio transmission systems. Hence, equalization generally is comparatively more important in radio transmission systems.

The VA-like equalizer 3 illustrated in FIG. 2 generates reliability information by combining first and second sets of reliability information. The first reliability information preferably is the probability ratio of the two preceding nodes merging at the recent transition state having the global maximum reliability among all transitions at time k. This is equivalent to the metric difference of the two paths entering the recent transition node having the minimum node metric. Also, the equalizer at this point makes a tentative decision about the value of the L last bit. Given the tentative decision of the value of the L last bit at time k, the equalizer categorizes the transition paths into the first group according to the tentative decision that the last bit at time k is "one" and the second group characterized by the tentative decision that the last bit at time k is "zero." For one group selected from these two groups, the second reliability information is the probability ratio of two maximum probabilities from the two sub-groups, where one sub-group is selected from the transition paths characterized by the L−1 last bit being "one" and the other sub-group is selected from the transition paths characterized by the L−1 last bit being "zero."

The second reliability information is equivalent to the metric difference of two candidate values of reliability information according to the tentative decision of the L last bit. Each of the candidate values is derived from the metric difference of two paths characterized by the L−1 last bit being "one" and "zero," respectively. Then the proposed equalizer combines the first reliability information at time k and the second reliability information at time k−1 in an equal-gain diversity operation. By applying this combined reliability information in addition to the hard decision to the de-interleaver and decoder in the following stages, performance improves.

In a particularly preferred embodiment, the first reliability information $\hat{L}_{1,k-L}$ at time k is the difference of NM_LOWER(k) and NM_UPPER(k), where NM_LOWER(k) and NM_UPPER(k) are the accumulated metrics on the transition paths to the node having the global minimum metric among all state transitions at time k. The second reliability information $\hat{L}_{2,k-L}$ at time k is the difference of two accumulated metrics from one of two groups. The first group includes NM_U1(k) and NM_U0(k) and the second group includes NM_L1(k) and NM_L0(k). Which of the two groups is chosen to provide the reliability information is determined by the tentative decision of $a_{k-L}$ made at time k. If the tentative decision of $a_{k-L}$ is "zero," the first group is selected, while if the tentative decision of $a_{k-L}$ is "one," the second group is selected. In the first group, NM_U0(k) is the minimum accumulated metric among the upper paths characterized by $a_{k-(L-1)}$ being "zero" and NM_U1(k) is the minimum accumulated metric among the upper paths characterized by $a_{k-(L-1)}$ being "one." In the second group, NM_L0(k) is the minimum accumulated metric among the lower paths characterized by $a_{k-(L-1)}$ being "zero" and NM_L1(k) is the minimum accumulated metric among the upper paths characterized by $a_{k-(L-1)}$ being "one."

The first and second reliability information is combined to provide a more accurate estimate through diversity. $\hat{L}_{2,k-L}$ is deferred to be combined with $\hat{L}_{1,k-L}$ to produce the output reliability information at time k. At time instant k, the output reliability information is an arithmetic average of $\hat{L}_{1,k-L}$ and $\hat{L}_{2,k-L}$ that is normalized by noise power $\hat{\sigma}_n^2$, that is, $\hat{L}_{k-L} = (\hat{L}_{1,k-L} + \hat{L}_{2,k-L-1})/4\hat{\sigma}_n^2$. Here the sign of $\hat{L}_{k-L}$ corresponds to the hard-decision for the value of bit $a_{k-L}$ and the magnitude relates to the reliability of this estimate ($\hat{L}_{k-L}$, probability associated with $a_{k-L}$).

The FIG. 2 wireless communication system includes a Viterbi-like receiver. Block 1 is the transmitter that consists of a modulator and RF transmitter that together convert the encoded sequences into electromagnetic waves for radiating through the fading channel. On the receiver side, an RF and analog receiver module 2 is followed by A/D converter 21 to convert analog signals to data samples and into digital formats. The digital samples are then fed into the channel estimator 22 for extracting information about the channels (i.e., the channel estimate or channel impulse response) and the estimate is provided to the equalizer. The channel estimator 22 estimates the channel coefficients $h_0, h_1, \ldots, h_L$ on the basis of a transmitted synchronization signal or a pilot signal. The channel estimator provides the channel estimate to the equalizer, which uses the estimated channel characteristics in analyzing and decoding the received symbols.

To find the transmitted sequence using maximum likelihood sequence estimation (MLSE), each received signal sample is compared to all the reference signals generated from the reference signal generator 23 with the knowledge of the estimated channel responses. That is, one counter in reference signal generator 23 generates a number within [0, $2^{L+1}-1$] (where L is the channel memory) corresponding to possible bit sequences to select the corresponding reference signal being generated. Then a distance between the reference signal and the received signal sample is calculated in metric calculator 24. After the add-compare-select (ACS) operation is calculated in metric calculator 24 for the two transitions entering a node, the path with the minimum accumulated node metric is selected and stored in the memory unit 33 accordingly. In other words, metric calculator 24 calculates new accumulated node metrics by adding old node metrics stored in 32 with the branch metrics. The metric calculator of sub-block 24 of FIG. 2 determines the probability of a state transition from one state to the following state. The node (accumulated) metrics are obtained by accumulating the successive branch metrics of possible state transitions. All node (accumulated) metrics at any sample time can be used to derive reliability information. Metric calculator 24 then passes the new accumulated node metrics to controller 31, which stores all new node metrics in memory unit 33. Controller 31 searches several minimum metrics and stores them in memory unit 34 for the subsequent reliability information calculation. The corresponding location to store the updated node metric is also determined by controller 31 but that function is not specified explicitly in FIG. 2 for simplicity.

The main purpose of the storage sub-blocks 32 and 33 as stated above is to store the node metrics of all states during processing. More precisely, the memory sub-blocks 32 and 33 contain a plurality of registers that are categorized into two kinds according to their purposes. The number of registers in memory unit 32 is $S=2^L$, with each register having W bits and storing the accumulated node metrics of $2^L$ states for the previous time step. The number of registers in memory unit 33 is also $2^L$. At the time step k, for each state, the controller computes the accumulated node metrics from the two preceding nodes and selects their minimum, which the controller then stores in memory unit 33. That is, the memory unit 33 stores the currently updated node metric, which is the minimum accumulated node between these two transitions. After the add-compare-select (ACS) operation is performed on all states, the contents of memory unit 32 are replaced with those of memory unit 33.

Figure 4A:
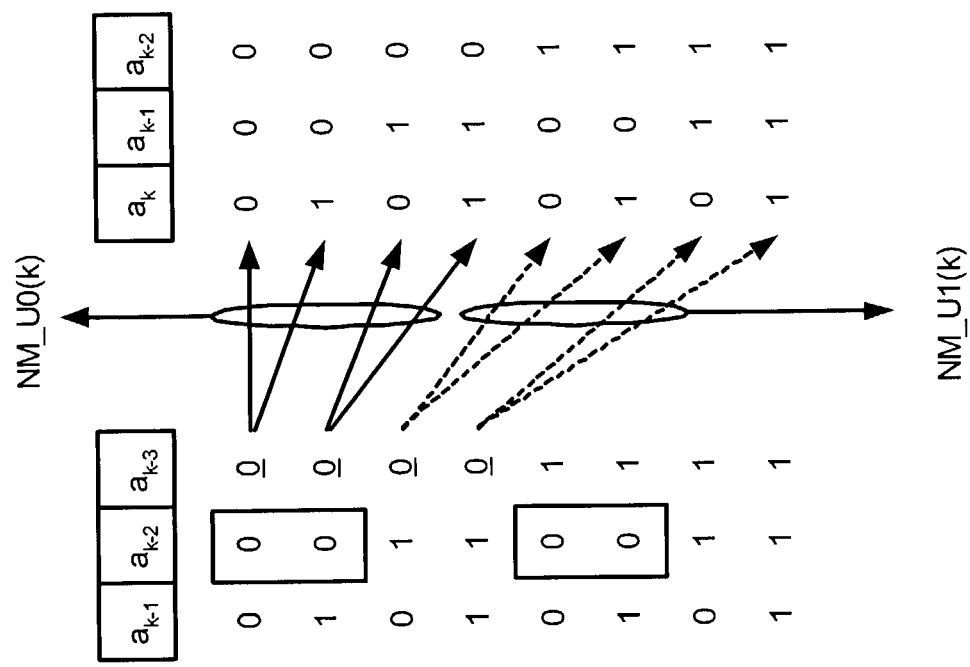
FIG. 4(a) illustrates how to generate NM_U0(k) and NM_U1(k) for a second part reliability measure for an exemplary system with channel memory L=3.
Figure 4B:
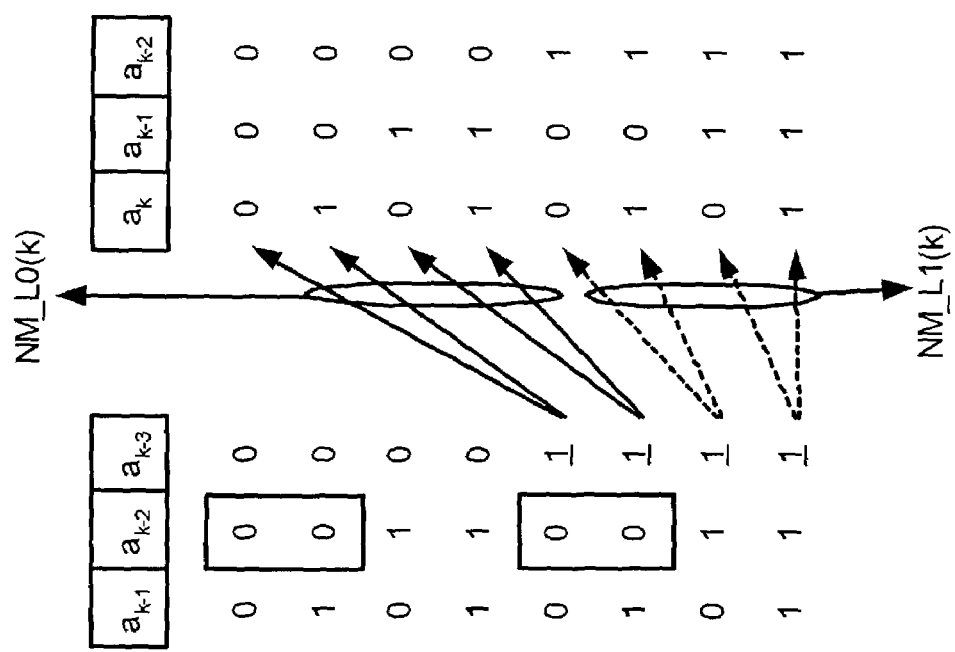
FIG. 4(b) illustrates how to generate NM_L0(k) and NM_L1(k) for a second part reliability measure for an exemplary system with channel memory L=3.

Controller 31 acts as a minimum searcher to find four metrics that are combined using diversity to provide more accurate reliability information. The memory unit 34 has six registers that act as buffers to store the metrics used for generating the reliability information with diversity. FIG. 4(a) and FIG. 4(b) illustrate a channel model having an L=3 channel memory for simplicity of explaining how diversity combining of reliability information is accomplished. To achieve diversity combining, preferred implementations divide all transitions into two groups. The first group, as shown in FIG. 4(a), has the transitions characterized by the L last bit $a_{k-L}$ as "zero." Within this first group are two sub-groups, where one sub-group includes all transitions represented by solid lines and characterized by the L−1 last bit as "zero" and the other sub-group has all transitions represented by the dashed line and characterized by the L−1 last bit as "one." Controller 31 finds the first sub-group transition having the minimum metric among these transitions characterized by the solid lines and this minimum metric is denoted as NM_U0(k). In addition, controller 31 finds the transition having the minimum metric among the transitions characterized by the dashed lines and the minimum metric is denoted as NM_U1(k). The letter "U" means the metrics occur in the first group. Meanwhile, the second group, as shown in FIG. 4(b), has the transitions characterized by the L last bit $a_{k-L}$ as "one." Controller 31 finds the first sub-group transitions having the minimum metric among the transitions represented by solid lines (characterized by the L−1 last bit as "zero") and the second sub-group transitions having the minimum metric among the transitions represented by dashed lines (characterized by the L−1 last bit as "one") and they are denoted as NM_L0(k) and NM_L1(k), respectively. The letter "L" means the metrics occur in the second group. Moreover, NM_U0(k), NM_U1(k), NM_L0(k), NM_L1(k) are stored in memory unit 34 for the subsequent reliability calculation.

Figure 3:
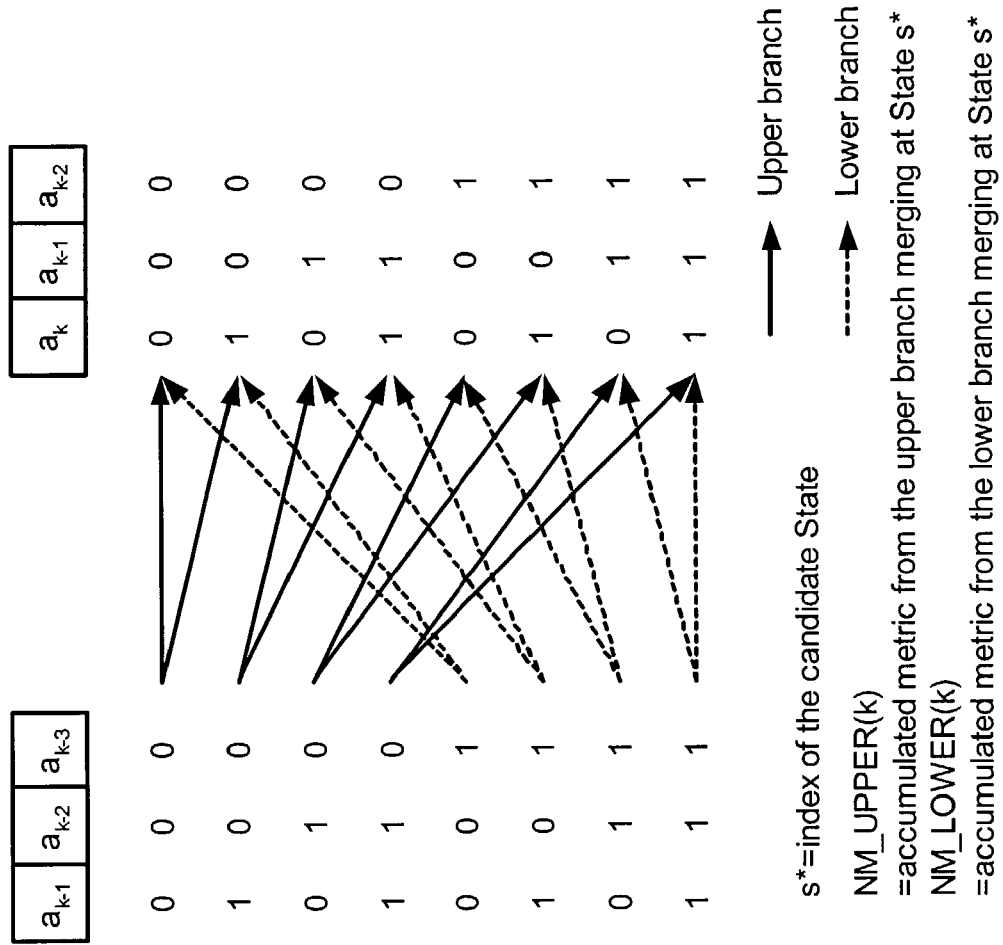
FIG. 3 illustrates how to generate NM_UPPER(k) and NM_LOWER(k) for a first part reliability measure for an exemplary system with channel memory L=3.

At time instant k, controller 31 also finds the node having the global minimum accumulated node metric. The corresponding updated node metric and that from the counterpart branch are stored in the memory unit 34. Meanwhile, a hard-decision on the L last bit $a_{k-L}$ is made at time k according to the node with the global minimum metric and the state transition information at time k. For instance, with reference to the transitions illustrated in FIG. 3, assume that the state "100" is the one with the global minimum metric and the accumulated node metrics from the upper branch and lower branch are NM_UPPER(k) and NM_LOWER(k) at time k, respectively. If the upper accumulated node metric is less than the lower one, then the hard-decision of $a_{k-3}$ is "0"; on the other hand, if the upper accumulated node metric is greater than the lower one, then the hard-decision of $a_{k-3}$ is "1."

With the hard decision of the L last bit $a_{k-L}$, the first reliability calculator 35 and second reliability calculator 36 produce the values of the first and second reliability information at time k. The first reliability information is simply the difference of NM_UPPER(k) and NM_LOWER(k). That is, the first reliability information is given by $\hat{L}_{1,k-L}$=NM_UPPER(k)−NM_LOWER(k).

Meanwhile, the second reliability information is obtained in the following way $\hat{L}_{2,k-L}$=NM_U0(k)−NM_U1(k) if the hard decision of $a_{k-L}$ is "0"

or $\hat{L}_{2,k-L}$=NM_L0(k)−NM_L1(k) if the hard decision of $a_{k-L}$ is "1."

Figure 5:
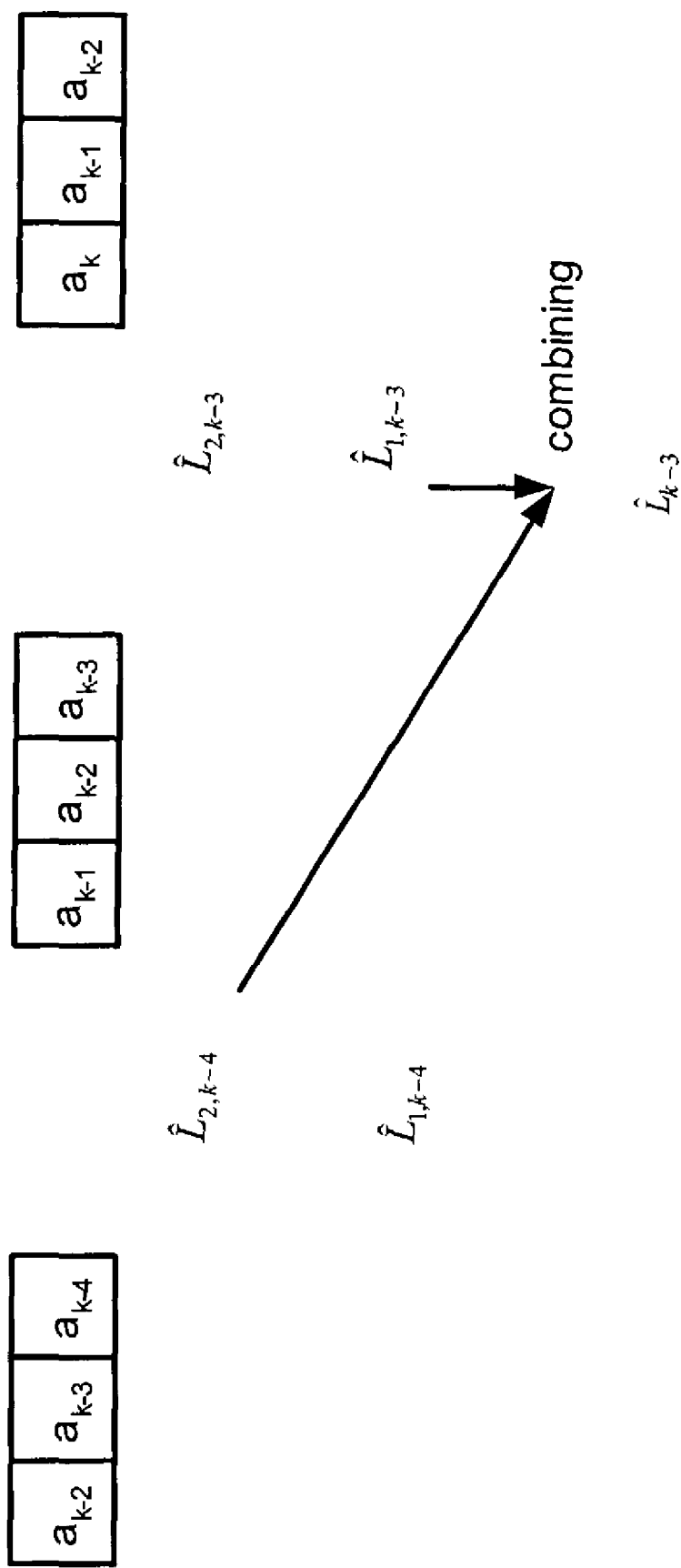
FIG. 5 illustrates a particularly preferred method for generating the reliability information with diversity combining for an exemplary system with channel memory L=3.

Having determined the first and second reliability information, the reliability calculator 37 calculates the final reliability information at time instant k from the arithmetic average of $\hat{L}_{1,k-L}$ and $\hat{L}_{2,k-L-1}$ followed by noise power normalization, i.e., $\hat{L}_{k-L}=(\hat{L}_{1,k-L}+\hat{L}_{2,k-L-1})/4\hat{\sigma}_n^2$, where $\hat{\sigma}_n^2$ is the estimated noise power calculated in reliability calculator 37. Note here that at each time instant k, the final reliability information is obtained by combining the first reliability information at time k and the second reliability information at k−1 followed by noise power normalization. More precisely, the second reliability information is deferred one symbol time and combined with the first reliability information to generate the final reliability information as depicted in FIG. 5 and then is delivered to the de-interleaver and decoder for further processing.

To accommodate for the effect of the time-varying characteristics of noise on the reliability information calculations, it is preferred that the reliability information $\hat{L}_{k-L}$ is normalized by the estimated noise power $\hat{\sigma}_n^2$.

The final reliability information can be an arithmetic average of the two components of the reliability information at time k−1 and k when using metrics such as square-distance metrics for the reliability estimates. Alternately, the final reliability information can be the geometric average of the two corresponding probability ratios at time k−1 and k, when probability ratios are used for reliability estimates.

The present invention has been described in terms of certain preferred embodiments thereof. Those of ordinary skill in the art will appreciate that various modifications might be made to the embodiments described here without varying from the basic teachings of the present invention. Consequently the present invention is not to be limited to the particularly described embodiments but instead is to be construed according to the claims, which follow.

We claim:

1. A receiver for a communications system, the receiver comprising:
   a receiver front end receiving signals from a wireless channel and providing sampled data signals;
   an equalizer responsive to the sampled data signals that provides estimates of transmitted data and outputs reliability information representative of a reliability of the estimates of the transmitted data; and
   a decoder responsive to the estimates of the transmitted data and the reliability information from the equalizer, the decoder generating recovered symbols,
   wherein the equalizer determines first reliability information for a first sample time, determines second reliability information for a second sample time earlier than the first sample time, and determines the output reliability information by combining the first and second reliability information.

2. The receiver of claim 1, wherein the first reliability information is a difference between a first and second accumulated metric for two preceding nodes merging at a node having a global minimum accumulated metric among all states.

3. The receiver of claim 1, wherein the first reliability information for a first sample time is a probability ratio for two preceding nodes merging at a most recent transition state having a global maximum probability among all transitions at the first sample time.

4. The receiver of claim 1, wherein the second reliability information is a difference between two minimum accumulated metrics from two sub-groups characterized by an L−1 last bit being a binary zero and one, respectively, in one of two groups categorized by a tentative decision of an L last bit being binary zero or one, wherein L represents a channel memory length.

5. The receiver of claim 1, wherein the combining includes normalizing the reliability information for an estimated noise power.

6. A receiver for a communications system, the receiver comprising:
   a receiver front end receiving signals from a wireless channel and providing sampled data signals;
   an equalizer responsive to the sampled data signals provides estimates of transmitted data and outputs reliability information representative of a reliability of the estimates of the transmitted data; and
   a decoder that recovers the estimates of the transmitted data according to the reliability information from the equalizer,
   wherein the equalizer generates reliability information $\hat{L}_{k-L}$ by combining of a first reliability function $\hat{L}_{1,k-L}$ at time k and a second reliability function $\hat{L}_{2,k-L-1}$ at time k−1.

7. The receiver of claim 6, wherein the combining is an arithmetic average of $\hat{L}_{1,k-L}$ and $\hat{L}_{2,k-L-1}$ normalized by noise power $\hat{\sigma}_n^2$.

8. The receiver of claim 6, wherein the first reliability information $\hat{L}_{1,k-L}$ at time k is the difference of NM_LOWER(k) and NM_UPPER(k), where NM_LOWER(k) and NM_UPPER(k) are accumulated metrics of transition paths to a node having a global minimum metric among all state transitions at time k.

9. The receiver of claim 6, wherein the second reliability information $\hat{L}_{2,k-L}$ at time k is a difference of two accumulated metrics from a first group and a second group, where the first group includes NM_U1(k) and NM_U0(k) and the second group includes NM_L1(k) and NM_L0(k),
   wherein in the first group, NM_U0(k) is a minimum accumulated metric among paths characterized by $a_{k-(L-1)}$ being "zero" and NM_U1(k) is a minimum accumulated metric among paths characterized by $a_{k-(L-1)}$ being "one",
   wherein in the second group, NM_L0(k) is a minimum accumulated metric among paths characterized by $a_{k-(L-1)}$ being "zero" and NM_L1(k) is a minimum accumulated metric among paths characterized by $a_{k-(L-1)}$ being "one", and
   wherein the equalizer selects one of the first and second groups by a tentative decision for a value of $a_{k-L}$ made at time k, where if the tentative decision of $a_{k-L}$ is "zero" the first group is selected, and if the tentative decision of $a_{k-L}$ is "one," the second group is selected.

10. The receiver of claim 9, wherein the combining is an arithmetic average of $\hat{L}_{1,k-L}$ and $\hat{L}_{2,k-L-1}$ normalized by noise power $\hat{\sigma}_n^2$.

11. The receiver of claim 8, wherein the second reliability information $\hat{L}_{2,k-L}$ at time k is a difference of two accumulated metrics from a first group and a second group, where the first group includes NM_U1(k) and NM_U0(k) and the second group includes NM_L1(k) and NM_L0(k),
    wherein in the first group, NM_U0(k) is a minimum accumulated metric among paths characterized by $a_{k-(L-1)}$ being "zero" and NM_U1(k) is a minimum accumulated metric among paths characterized by $a_{k-(L-1)}$ being "one",
    wherein in the second group, NM_L0(k) is a minimum accumulated metric among paths characterized by $a_{k-(L-1)}$ being "zero" and NM_L1(k) is a minimum accumulated metric among paths characterized by $a_{k-(L-1)}$ being "one";
    wherein the equalizer selects one of the first and second groups by a tentative decision for a value of $a_{k-L}$ made at time k, where if the tentative decision of $a_{k-L}$ is "zero" the first group is selected, and if the tentative decision of $a_{k-L}$ is "one," the second group is selected.

12. The receiver of claim 11, wherein the combining is an arithmetic average of $\hat{L}_{1,k-L}$ and $\hat{L}_{2,k-L-1}$ normalized by noise power $\hat{\sigma}_n^2$.

* * * * *